United States Patent [19]

Parker

[11] 3,751,123

[45] Aug. 7, 1973

[54] LOW MASS ROLLING ELEMENT FOR BEARINGS

[75] Inventor: Richard J. Parker, North Olmsted, Ohio

[73] Assignee: The United States of America as represented by the Administrator of the National Aeronautics and Space Adminstration, Washington, D.C.

[22] Filed: Nov. 24, 1971

[21] Appl. No.: 201,904

[52] U.S. Cl. .............................. 308/193, 308/188
[51] Int. Cl. ........................................... F16c 33/32
[58] Field of Search .................... 308/188, 215, 217

[56] References Cited
UNITED STATES PATENTS

| 642,204 | 1/1900 | Brooks | 308/215 |
| 1,904,253 | 4/1933 | Rydbeck | 308/215 |
| 3,337,278 | 8/1967 | Vigh | 308/188 |
| 3,491,423 | 1/1970 | Haller | 308/188 |

Primary Examiner—Manuel A. Antonakas
Assistant Examiner—Frank Susko
Attorney—N. T. Musial, John R. Manning et al.

[57] ABSTRACT

A low mass rolling element has a lightweight core with a hollow center or is made of a low density material. The core is plated to provide a hard surface.

6 Claims, 3 Drawing Figures

PATENTED AUG 7 1973     3,751,123

INVENTOR
RICHARD J. PARKER

BY Norman T. Musial

Gene E. Shook    ATTORNEYS

3,751,123

LOW MASS ROLLING ELEMENT FOR BEARINGS

ORIGIN OF THE INVENTION

The invention described herein was made by an employee of the United States Government and may be manufactured and used by or for the Government for governmental purposes without the payment of any royalties thereon or therefor.

PRIOR ART

This invention is concerned with an improved bearing having low mass rolling elements. The invention is particularly directed to rolling elements having lightweight cores that are plated.

When conventional rolling-element bearings are used at high rotative speeds centrifugal forces of the rolling elements on the outer races are detrimental to bearing life. Low mass rolling elements reduce this centrifugal force thereby increasing the life and reliability of high speed bearings.

Low mass rolling elements, such as hollow balls and rollers, are used in bearings on shafts which start and stop quickly. Less energy is required for acceleration and deceleration with hollow rolling elements because of their low inertia.

Low mass rolling elements can be fabricated of a material with a density significantly less than bearing steels. Other low mass rolling elements are hollow to reduce the mass. In either hollow rolling elements or those of low density material the fatigue strength must not be less than that of solid elements of high quality bearing steel. Rolling elements of relatively low density material have shown much lower fatigue strength than have conventional balls and rollers. Hollow balls of conventional bearing steels with significant mass reduction have shown either a weakness in the weld material or flexure fatigue of the wall.

SUMMARY OF THE INVENTION

These problems have been solved by providing low mass rolling elements constructed in accordance with the present invention for improved bearings. Low mass rolling elements are produced by forming hollow cores of an inexpensive steel. Also a lightweight material can be used to make a low mass solid core. The low mass solid core and the hollow core are plated with iron and heat treated to form a hard surface.

OBJECTS OF THE INVENTION

It is, therefore, an object of the present invention to provide low mass rolling elements for bearings having a high fatigue strength and high resistance to flexure fatigue.

Another object of the invention is to provide low mass rolling elements for a bearing whose fatigue strength is as good as or better than solid rolling elements of conventional materials.

A further object of the invention is to increase the life and reliability of high speed ball bearings by using low mass balls.

These and other objects of the invention will be apparent from the specification which follows and from the drawing wherein like numerals are used throughout to identify like parts.

DESCRIPTION OF THE PREFERRED EMBODIMENT

Figure 1:
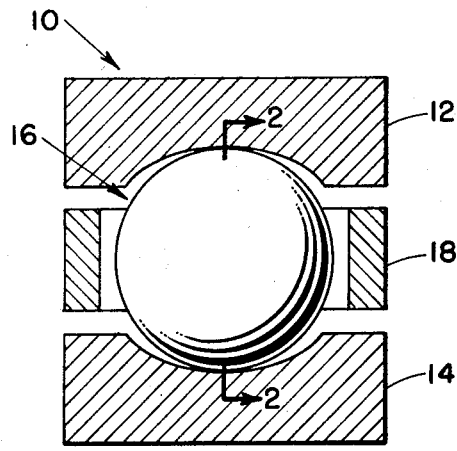
FIG. 1 is a vertical section view through a rolling element bearing having a rolling element constructed in accordance with the invention.

Referring now to the drawing there is shown in FIG. 1 an improved rolling element bearing assembly 10 of the ball bearing type. The bearing assembly 10 comprises an outer race 12 spaced from the inner race 14. Rolling elements 16 in the form of balls roll between the outer race 12 and the inner race 14. The balls are properly spaced by a separator 18 or cage.

Figure 2:
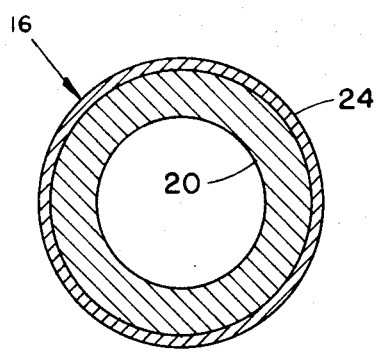
FIG. 2 is an enlarged sectional view taken along the line 2-2 in FIG. 1.
Figure 3:
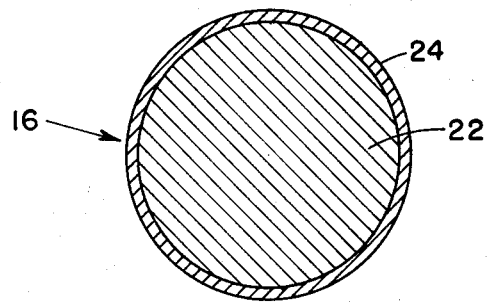
FIG. 3 is an enlarged vertical section view similar to FIG. 2 showing an alternate embodiment of the invention.

According to the present invention the rolling element 16 is made up of either a hollow core 20 shown in FIG. 2 or a solid lightweight core 22 shown in FIG. 3. Both the cores 20 and 22 are covered by a plated surface material 24.

The hollow core 20 shown in FIG. 2 is made by forming a hollow sphere of inexpensive low carbon or medium carbon steel. This hollow sphere 20 is fabricated by welding together two hemispheres of the low carbon or medium carbon steel. This can be accomplished in accordance with the teachings of copending application Ser. No. 196,970 by Thomas Moore entitled "Production of Hollow Components for Rolling Element Bearings by Diffusion Welding" which was filed Nov. 9, 1971.

The lightweight solid core 22 shown in FIG. 3 is made of relatively low density material, such as aluminum oxide. This core 22 is formed by cold pressing and sintering, hot pressing, or other powder metallurgy techniques.

The hollow spherical core 20 and the lightweight core 22 are plated with pure iron. This is accomplished by electrolytic deposition, ion plating, or sputtering.

The plated cores are then heat treated by a case hardening process. Carburizing has been satisfactory. The plated cores are then ground and finished to the required tolerances.

Each rolling element 16 has a low mass and a hard homogeneous surface with a relatively soft and ductile inner core. The hardness of the iron plating 24 is between Rockwell C 60 and 65. The thickness of the finished iron plated surface is preferably at least twice the depth of the maximum shear stress expected in the application. This thickness is on the order of 0.012 to 0.015 inch. The homogeneous iron 24 is inclusion free and can provide rolling-element fatigue strength equal to or better than conventional high quality bearing steels. The relatively soft ductile inner hollow core 20 eliminates the problem of flexure fatigue of the wall. No flexure problem is encountered in the solid core 22.

The races 12 and 14 are fabricated from ring shaped blanks of a high hardenability bearing steel, such as AISI M-50. The blanks are heat treated to a Rockwell C hardness of 58 or greater. The ring blanks are than ground to specified dimensions to form an inner race and an outer race.

Although a preferred embodiment of the invention has been described it will be appreciated that various modifications may be made without departing from the spirit of the invention or the scope of the subjoined claims. The bearing assembly 10 can be made to form an angular contact ball bearing to accommodate radial or thrust loads or to form deep groove ball bearings to take primarily radial loads.

What is claimed is:

1. An improved bearing comprising
   an inner race,
   an outer race spaced from said inner race, and
   a plurality of rolling elements positioned between said inner and outer races, each of said rolling elements consisting essentially of
   a core having a low mass to reduce the centrifugal forces acting on said outer race and to reduce the inertia of said rolling element, said core having a homogeneous inclusion free iron plating on the outer surface thereof to provide fatigue strength, said plating having a thickness between about 0.012 inch and 0.015 inch.

2. A bearing as claimed in claim 1 wherein the plating has a hardness between Rockwell C 60 and 65.

3. A bearing as claimed in claim 1 wherein the core is solid and has a density less than said plating.

4. A bearing as claimed in claim 3 wherein the solid core is aluminum oxide.

5. A bearing as claimed in claim 1 wherein the inner and outer races have a Rockwell C hardness of 58 or greater.

6. A low mass rolling element for a bearing consisting essentially of
   a lightweight solid core of a low density material, and
   an iron plating having a thickness between about 0.012 inch and 0.015 inch on said core to provide a hard surface, said iron plating having a Rockwell C hardness between 60 and 65.

* * * * *